(12) United States Patent
Luo et al.

(10) Patent No.: US 10,413,864 B2
(45) Date of Patent: Sep. 17, 2019

(54) METHOD AND APPARATUS FOR REMOVING SULFUR OXIDES FROM GAS

(71) Applicant: Jiangnan Environmental Protection Group Inc., Grand Cayman (KY)

(72) Inventors: Jing Luo, Nanjing (CN); Changxiang Xu, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 0 days.

(21) Appl. No.: 16/244,562

(22) Filed: Jan. 10, 2019

(65) Prior Publication Data

US 2019/0143265 A1   May 16, 2019

Related U.S. Application Data

(63) Continuation of application No. 16/160,035, filed on Oct. 15, 2018, which is a continuation of application
(Continued)

(30) Foreign Application Priority Data

Mar. 15, 2017   (CN) .......................... 2017 1 0154157

(51) Int. Cl.
*B01D 53/50* (2006.01)
*B01D 47/06* (2006.01)
(Continued)

(52) U.S. Cl.
CPC .......... *B01D 53/501* (2013.01); *B01D 9/0018* (2013.01); *B01D 47/06* (2013.01);
(Continued)

(58) Field of Classification Search
CPC .... B01D 53/1481; B01D 53/40; B01D 53/50; B01D 53/502; B01D 53/504; B01D 53/78; B01D 53/75; B01D 2251/2062; B01D 2251/2065; B01D 2257/302; B01D 2258/0283
See application file for complete search history.

(56) References Cited

U.S. PATENT DOCUMENTS 2,810,627 A   10/1957 Johnstone et al.
3,752,877 A    8/1973 Beavon
(Continued)

FOREIGN PATENT DOCUMENTS

CL   201302179   7/2013
CL   201600812   4/2016
(Continued)

OTHER PUBLICATIONS

Office Action issued in U.S. Appl. No. 14/829,905 dated Nov. 16, 2015.
(Continued)

*Primary Examiner* — Timothy C Vanoy
(74) *Attorney, Agent, or Firm* — Weiss & Arons LLP

(57) ABSTRACT

Methods, apparatus, and compositions for cleaning gas. The use of segmented multistage ammonia-based liquid spray with different oxidation potentials to remove sulfur compounds from gas. The use of different oxidation potentials may reduce unwanted ammonia slip.

29 Claims, 1 Drawing Sheet

Related U.S. Application Data

No. 15/481,736, filed on Apr. 7, 2017, now Pat. No. 10,207,220.

(51) Int. Cl.

| | | |
|---|---|---|
| *B01D 51/10* | (2006.01) | |
| *C01C 1/24* | (2006.01) | |
| *B01D 9/00* | (2006.01) | |
| *B01D 53/96* | (2006.01) | |
| *B01D 53/78* | (2006.01) | |

(52) U.S. Cl.
CPC ......... *B01D 51/10* (2013.01); *B01D 53/502* (2013.01); *B01D 53/504* (2013.01); *B01D 53/78* (2013.01); *B01D 53/96* (2013.01); *C01C 1/24* (2013.01); *B01D 2009/0086* (2013.01); *B01D 2251/10* (2013.01); *B01D 2252/102* (2013.01); *B01D 2257/302* (2013.01); *B01D 2257/406* (2013.01)

(56) References Cited

U.S. PATENT DOCUMENTS

| | | |
|---|---|---|
| 3,983,217 A | 9/1976 | Muraki et al. |
| 4,250,160 A | 2/1981 | Eakman |
| 4,294,590 A | 10/1981 | Linde et al. |
| 4,324,776 A | 4/1982 | Kim |
| 4,378,977 A | 4/1983 | Linde et al. |
| 4,552,747 A | 11/1985 | Goar |
| 4,690,807 A | 9/1987 | Saleem |
| 5,019,361 A | 5/1991 | Hakka |
| 5,106,607 A | 4/1992 | Chopin et al. |
| 5,362,458 A | 11/1994 | Saleem et al. |
| 5,632,967 A | 5/1997 | Nasato |
| 6,063,352 A | 5/2000 | Risse et al. |
| 6,066,304 A | 5/2000 | Freetly et al. |
| 6,139,807 A | 10/2000 | Risse et al. |
| 6,221,325 B1 | 4/2001 | Brown et al. |
| 6,444,185 B1 | 9/2002 | Nougayrede et al. |
| 6,508,998 B1 | 1/2003 | Nasato |
| 6,569,398 B2 | 5/2003 | Fenderson |
| 6,616,908 B2 | 9/2003 | Watson et al. |
| 6,776,974 B1 | 8/2004 | Burmaster et al. |
| 6,991,771 B2 | 1/2006 | Duncan et al. |
| 7,351,392 B2 | 4/2008 | Chen et al. |
| 7,635,408 B2 | 12/2009 | Mak et al. |
| 7,648,692 B2 | 1/2010 | Chow et al. |
| 7,754,471 B2 | 7/2010 | Chen et al. |
| 7,879,135 B2 | 2/2011 | Ravikumar et al. |
| 7,910,077 B2 | 3/2011 | Chow et al. |
| 8,178,070 B2 | 5/2012 | Wong et al. |
| 8,206,669 B2 | 6/2012 | Schaffer et al. |
| 8,361,432 B2 | 1/2013 | Parekh et al. |
| 8,444,943 B2 | 5/2013 | Lamar |
| 8,545,793 B2 | 10/2013 | Thielert |
| 8,871,176 B2 | 10/2014 | Liu et al. |
| 9,370,745 B2 | 6/2016 | Xu et al. |
| 2003/0175190 A1 | 9/2003 | Duncan et al. |
| 2004/0105802 A1 | 6/2004 | Joanna et al. |
| 2007/0248518 A1 | 10/2007 | Jung et al. |
| 2009/0004070 A1 | 1/2009 | Chow et al. |
| 2011/0195008 A1 | 8/2011 | Menzel et al. |
| 2011/0243822 A1 | 10/2011 | Mortson |
| 2015/0352489 A1 | 12/2015 | Luo et al. |

FOREIGN PATENT DOCUMENTS

| | | |
|---|---|---|
| CL | 201602018 | 8/2016 |
| CN | 1280032 A | 1/2001 |
| CN | 201880482 U | 6/2001 |
| CN | 1377722 A | 11/2002 |
| CN | 1178735 C | 4/2003 |
| CN | 1408464 A | 4/2003 |
| CN | 1164480 C | 9/2004 |
| CN | 2640584 Y | 9/2004 |
| CN | 2640585 Y | 9/2004 |
| CN | 2668235 Y | 1/2005 |
| CN | 1617831 A | 5/2005 |
| CN | 2746971 Y | 12/2005 |
| CN | 2746972 Y | 12/2005 |
| CN | 2746973 Y | 12/2005 |
| CN | 2754711 Y | 2/2006 |
| CN | 1251965 C | 4/2006 |
| CN | 2772609 Y | 4/2006 |
| CN | 2778373 Y | 5/2006 |
| CN | 2799059 Y | 7/2006 |
| CN | 2799060 Y | 7/2006 |
| CN | 1850733 A | 10/2006 |
| CN | 1283346 C | 11/2006 |
| CN | 1887408 | 1/2007 |
| CN | 1887409 A | 1/2007 |
| CN | 1321723 C | 6/2007 |
| CN | 101085410 A | 12/2007 |
| CN | 201030298 Y | 3/2008 |
| CN | 201052456 Y | 4/2008 |
| CN | 100395006 C | 6/2008 |
| CN | 201109711 Y | 9/2008 |
| CN | 100428979 C | 10/2008 |
| CN | 201129965 Y | 10/2008 |
| CN | 201132102 Y | 10/2008 |
| CN | 101352642 A | 1/2009 |
| CN | 201179415 Y | 1/2009 |
| CN | 100460045 C | 2/2009 |
| CN | 100475313 C | 4/2009 |
| CN | 101422693 A | 5/2009 |
| CN | 201231130 Y | 5/2009 |
| CN | 101524620 | 9/2009 |
| CN | 201320447 Y | 10/2009 |
| CN | 201333376 Y | 10/2009 |
| CN | 101575103 A | 11/2009 |
| CN | 101585511 A | 11/2009 |
| CN | 201380037 Y | 1/2010 |
| CN | 201380038 Y | 1/2010 |
| CN | 201380039 Y | 1/2010 |
| CN | 201380040 Y | 1/2010 |
| CN | 100588608 C | 2/2010 |
| CN | 101642629 A | 2/2010 |
| CN | 201423237 Y | 3/2010 |
| CN | 101274750 B | 6/2010 |
| CN | 101745303 A | 6/2010 |
| CN | 201492952 U | 6/2010 |
| CN | 201529487 U | 7/2010 |
| CN | 201529488 U | 7/2010 |
| CN | 201537456 U | 8/2010 |
| CN | 101274196 B | 12/2010 |
| CN | 101182926 B | 1/2011 |
| CN | 202105585 U | 1/2011 |
| CN | 101519192 B | 2/2011 |
| CN | 101579600 B | 4/2011 |
| CN | 102000490 A | 4/2011 |
| CN | 102012034 A | 4/2011 |
| CN | 101456541 B | 5/2011 |
| CN | 101576261 B | 5/2011 |
| CN | 101579602 B | 5/2011 |
| CN | 102061206 A | 5/2011 |
| CN | 101274204 B | 6/2011 |
| CN | 101670231 B | 8/2011 |
| CN | 201912884 U | 8/2011 |
| CN | 201912885 U | 8/2011 |
| CN | 201944861 U | 8/2011 |
| CN | 201949808 U | 8/2011 |
| CN | 102205202 A | 10/2011 |
| CN | 102380305 A | 3/2012 |
| CN | 102381685 A | 3/2012 |
| CN | 102381686 A | 3/2012 |
| CN | 102423597 A | 4/2012 |
| CN | 101791517 B | 5/2012 |
| CN | 102451604 A | 5/2012 |
| CN | 101456540 B | 7/2012 |
| CN | 101574614 B | 7/2012 |
| CN | 101637685 B | 7/2012 |
| CN | 102631827 A | 8/2012 |
| CN | 202460375 U | 10/2012 |

(56) References Cited

FOREIGN PATENT DOCUMENTS

| | | |
|---|---|---|
| CN | 202460420 U | 10/2012 |
| CN | 202460438 U | 10/2012 |
| CN | 101530727 B | 11/2012 |
| CN | 101955828 B | 11/2012 |
| CN | 102211762 B | 11/2012 |
| CN | 101972592 B | 12/2012 |
| CN | 202538627 U | 12/2012 |
| CN | 101934191 B | 1/2013 |
| CN | 102049186 B | 1/2013 |
| CN | 202725003 U | 2/2013 |
| CN | 202751942 U | 2/2013 |
| CN | 202754802 U | 2/2013 |
| CN | 202829575 U | 3/2013 |
| CN | 101418246 B | 4/2013 |
| CN | 102228777 B | 4/2013 |
| CN | 202912691 U | 5/2013 |
| CN | 202924730 U | 5/2013 |
| CN | 202953829 U | 5/2013 |
| CN | 102381687 B | 8/2013 |
| CN | 203159221 U | 8/2013 |
| CN | 203264545 U | 11/2013 |
| CN | 203291675 U | 11/2013 |
| CN | 102489140 B | 12/2013 |
| CN | 103418223 A | 12/2013 |
| CN | 203329558 U | 12/2013 |
| CN | 203612955 U | 5/2014 |
| CN | 102942162 B | 8/2014 |
| CN | 203781842 U | 8/2014 |
| CN | 102910593 B | 9/2014 |
| CN | 102847431 B | 10/2014 |
| CN | 103204477 B | 10/2014 |
| CN | 103446859 B | 10/2014 |
| CN | 104138713 A | 11/2014 |
| CN | 103301732 B | 1/2015 |
| CN | 103041679 B | 2/2015 |
| CN | 103301736 B | 2/2015 |
| CN | 104368231 A | 2/2015 |
| CN | 204134465 U | 2/2015 |
| CN | 204151066 U | 2/2015 |
| CN | 102895870 B | 3/2015 |
| CN | 102923670 B | 3/2015 |
| CN | 204198421 U | 3/2015 |
| CN | 103223292 B | 4/2015 |
| CN | 104555939 A | 4/2015 |
| CN | 204233957 U | 4/2015 |
| CN | 103112831 B | 5/2015 |
| CN | 204352660 U | 5/2015 |
| CN | 103301705 B | 8/2015 |
| CN | 103482583 B | 9/2015 |
| CN | 104923046 A | 9/2015 |
| CN | 104927894 A | 9/2015 |
| CN | 104941423 A | 9/2015 |
| CN | 104946296 A | 9/2015 |
| CN | 103463949 B | 12/2015 |
| CN | 105110819 A | 12/2015 |
| CN | 105126573 A | 12/2015 |
| CN | 105195002 A | 12/2015 |
| CN | 105195002 A * | 12/2015 ............ B01D 53/78 |
| CN | 104353258 B | 1/2016 |
| CN | 104249995 B | 4/2016 |
| CN | 205235588 U | 5/2016 |
| CN | 205245200 U | 5/2016 |
| CN | 205252720 U | 5/2016 |
| CN | 205252721 U | 5/2016 |
| CN | 205252722 U | 5/2016 |
| CN | 205262780 U | 5/2016 |
| CN | 103822217 B | 6/2016 |
| CN | 105617821 A | 6/2016 |
| CN | 105727699 B | 7/2016 |
| CN | 105757688 A | 7/2016 |
| CN | 104555940 B | 8/2016 |
| CN | 105841168 A | 8/2016 |
| CN | 105854566 A | 8/2016 |
| CN | 104524948 B | 9/2016 |
| CN | 205549846 U | 9/2016 |
| CN | 205562498 U | 9/2016 |
| CN | 103521060 B | 1/2017 |
| CN | 103939918 B | 1/2017 |
| CN | 104208992 B | 2/2017 |
| CN | 104258713 B | 2/2017 |
| CN | 104528659 B | 4/2017 |
| DE | 3733319 A1 | 9/1989 |
| EP | 165609 B1 | 6/1985 |
| EP | 212523 A2 | 3/1987 |
| JP | S47-043737 | 11/1972 |
| TW | 497985 | 8/2002 |
| WO | WO200507505 A1 | 8/2005 |
| WO | WO2005113429 A1 | 12/2005 |
| WO | WO2006113935 A2 | 10/2006 |
| WO | WO2012152919 A1 | 11/2012 |

OTHER PUBLICATIONS

Office Action issued in U.S. Appl. No. 14/829,905 dated Feb. 29, 2016.
Office Action issued in U.S. Appl. No. 14/829,909 dated Apr. 15, 2016.
Office Action issued in U.S. Appl. No. 14/829,909 dated Dec. 14, 2016.
Office Action issued in U.S. Appl. No. 14/829,909 dated Feb. 14, 2017.
International Search Report issued for International Application No. PCT/CN2013/074657, dated Dec. 26, 2013.
International Search Report issued for International Application No. PCT/CN2014/087887, dated Jan. 14, 2015.
Supplementary European Search Report issued in European Application No. 13882863.7, dated Mar. 11, 2016.
Google machine English translation of CN105195002A.
Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.
Shengli Cao, "Coal Chemical Product Technology," Metallurgical Industry Press (China), 43, Jun. 2003.
Google machine English translation of CN1283346C, 2006.
Google machine English translation of CN2640585Y, 2004.
Google machine English translation of CN2772609Y, 2006.
Google machine English translation of CN100428979C, 2008.
Google machine English translation of CN201912885U, 2011.
Google machine English translation of CN10322392A, 2013.
Supplementary European Search Report issued in European Application No. 17177485.4, dated Nov. 7, 2017, including Annex (European Patent Office English translation of CN105727699A).
Office Action issued by the Intellectual Property Office of India in Indian Application No. 201734021936, dated Feb. 14, 2019.
Office Action issued by the Japanese Intellectual Property Office in Japanese Application No. 2017-123088, dated Apr. 16, 2018.
Office Action issued by the Intellectual Property Office of Brazil in Brazilian Application No. BR102017013527-9, Mar. 18, 2019.
Examination Report issued by the Chilean Patent Office, Apr. 10, 2019.

* cited by examiner

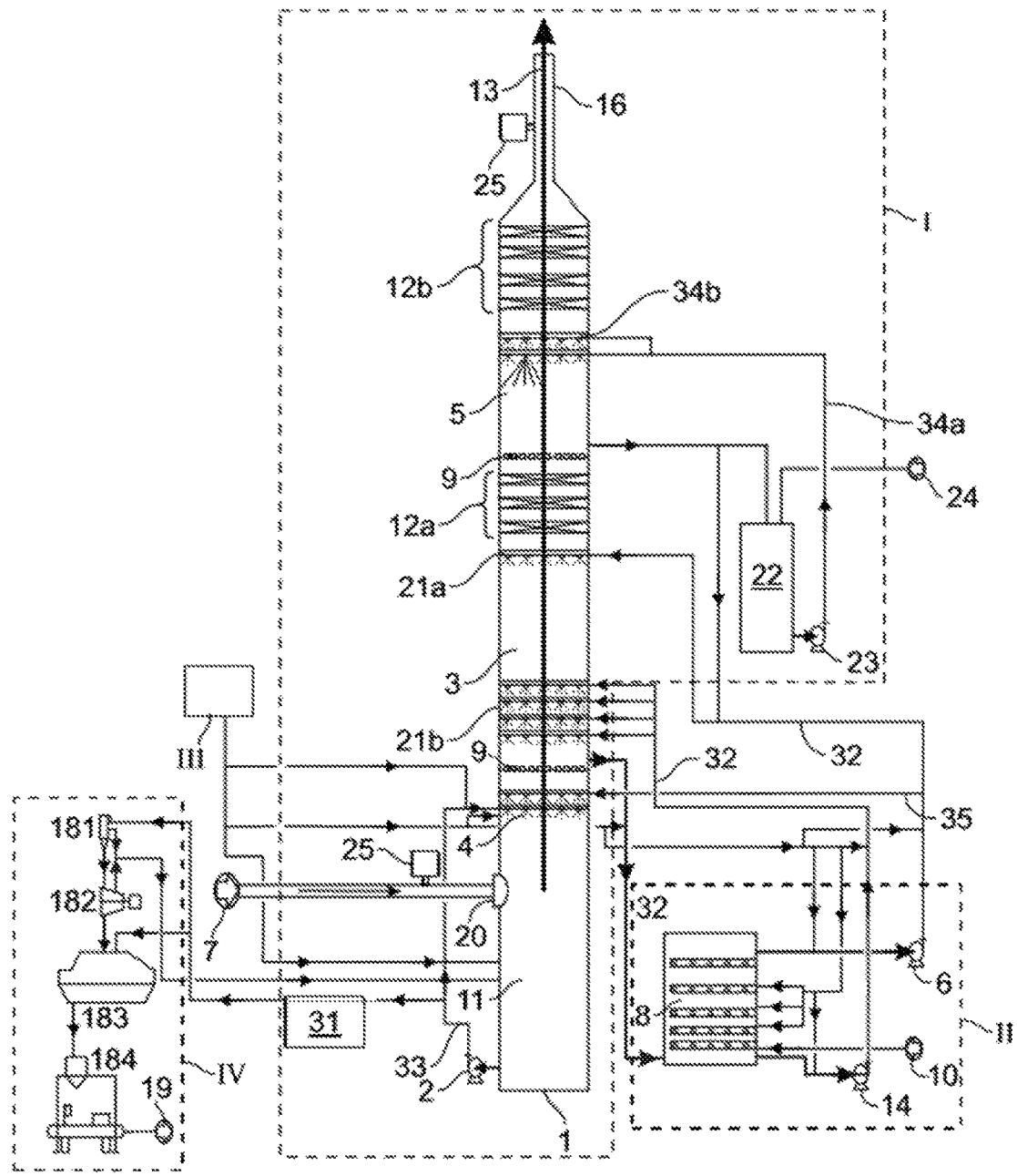

METHOD AND APPARATUS FOR REMOVING SULFUR OXIDES FROM GAS

This application is a continuation of U.S. application Ser. No. 16/160,035, filed on Oct. 15, 2018, which claims the benefit of U.S. application Ser. No. 15/481,736, filed on Apr. 7, 2017, which claims priority under 35 U.S.C. § 119 of Chinese Patent Application No. 201710154157.3, filed on Mar. 15, 2017, all of which are hereby incorporated herein in their entireties.

TECHNICAL FIELD

The invention relates to compositions, methods, and apparatus for removing sulfur oxides, especially sulfur dioxide, from exhaust gases.

BACKGROUND OF THE INVENTION

Numerous industrial processes, especially coal and petroleum combustion, produce exhaust gases containing one or more sulfur oxides. As more such industrial processes are performed, more and more sulfur oxides are being released into the air. Environmental and health concerns have motivated government and industry to reduce the levels of sulfur oxides in exhaust gases.

Chinese patent application CN201010519504.6 describes the Claus process, which recovers elemental sulfur from the gaseous hydrogen sulfide using sequential use of multiple thermal reactors and catalytic condensers.

The limestone-gypsum flue gas desulfurization process involves absorption of sulfur dioxide by limestone. The sulfur dioxide is oxidized by reacting it with air sparged into an absorber-recirculation tank.

As described in Chinese patent document no. 201510009642 and in patent applications nos. PCT/CN2014/087887 and PCT/CN2013/074657, ammonia is an effective desulfurization agent because it is a material that is easy to dissolve in water, is highly reactive with sulfur oxides, and readily produces easy to remove ammonia-sulfur species such as ammonium sulfate. It also produces ammonium sulfite.

Unfortunately, use of ammonia as a desulfurization agent results in additional complexities and difficulties. Because it is so reactive, ammonia can also form other species that exit with the gas in the form of aerosol pollutants. In addition, ammonia readily evaporates into a gas and flows along with the rest of the gas. As a result, ammonia slip is a common problem associated with desulfurization using ammonia.

SUMMARY

Apparatus and methods for cleaning gas are provided. The apparatus may include a first chamber and a second chamber. The first chamber may include a first liquid spray array and a second, more downstream, liquid spray array. The second chamber may be in fluidic communication with the first. The second chamber may be separated from the first by a liquid-vapor separator. The first liquid spray array may be constructed and arranged to spray an oxidized ammonia bearing liquid that has a greater sulfur absorbing capacity than the liquid of the second spray array.

BRIEF DESCRIPTION OF THE DRAWING

A detailed description of the invention is hereafter described with specific reference being made to the drawings in which:

FIG. 1 is a schematic illustration of an apparatus for desulfurizing gas in accordance with the principles of the invention.

The drawing is an exemplification of the principles of the invention and is not intended to limit the invention to the particular embodiments illustrated.

DETAILED DESCRIPTION

Definitions

"Ammonia-Bearing Liquid" means a liquid comprising at least one ammonia or amine based compound, including but not limited to ammonium salts, ammonium ions ($NH_4^+$), ammonium sulfate, ammonium sulfite, and any combination thereof. The liquid may be water.

"Ammonia recovery" means that fraction or percentage of ammonia added to a gas cleaning process that is subsequently captured and extracted from the process.

"Ammonia Slip" means ammonia or one or more ammonia/amine bearing species that escape with the exhaust of the gas flow. The species are derived from ammonia or ammonia/amine bearing species that were added to the gas flow.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"Exhaust" means a flow of gas exiting an industrial or chemical process. It includes but is not limited to flue gas, tail gas, exhaust gases from ovens, furnaces, boilers, and/or generators. It may comprise combustion products derived from the combustion of air and flammable material, residual material from chemical processes, which may include water, nitrogen, and pollutants, such as particulate matter, soot, carbon monoxide, nitrogen oxides, and sulfur oxides. The exhaust of one process may be a gaseous input to another process.

"Oxidation Rate" means the percentage, calculated by mol percent, of a given material that has been converted into an identified more-oxidized species of the material. For example, in a mixture containing ammonia bearing species and sulfur oxides, if X mol % of the mixture is ammonium sulfate, Y mol % is ammonium sulfite, and Z mol % is some other ammonia, sulfur, and/or oxygen containing species with an oxidation potential greater than ammonium sulfate, because ammonium sulfate is the identified most-oxidized species, the oxidation rate of the mixture would be X mol %.

"Spray Coverage" is a divergence of spray from a nozzle or an array of nozzles. The greater is the divergence, the greater is the spray coverage.

"Sulfur Absorbing Capacity" means a measure of a first item's effectiveness at removing sulfur oxides (or optionally other sulfur bearing species) relative to a second item's effectiveness. It can be measured by comparison of the relative number of mols of the first and second items needed to remove from the same gas flow a mol of sulfur oxide (or optionally another sulfur bearing species) entrained in the gas flow. An item with a greater sulfur absorbing capacity will remove the same number of mols of sulfur oxide (or optionally another sulfur bearing species) entrained in that gas flow with the input of fewer mols of that item than will an item with a lesser sulfur absorbing capacity.

"Sulfur Oxides or SOx" means a chemical species containing sulfur and oxygen. It includes compounds such as sulfur monoxide (SO), sulfur dioxide ($SO_2$), sulfur trioxide ($SO_3$), [higher sulfur oxides ($SO_3$ and $SO_4$ and polymeric condensates of them), disulfur monoxide ($S_2O$), disulfur dioxide ($S_2O_2$), and lower sulfur oxides ($S_7O_2$, $S_6O_2$, and $S_nO_x$, where n and x are any possible stoichiometric numerical values).

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley & Sons, Inc.) shall control, if provided therein.

EMBODIMENTS

Sulfur oxides may be removed from a gas flow by passing the gas through a segmented process stream comprising at least two ammonia feeding points. The segmented process stream may be a process having two or more distinct chambers separated from each other by a liquid-vapor separator. Within the more-upstream chamber there may be two or more ammonia feeding points, one more upstream than the other, constructed and arranged to spray an ammonia-bearing liquid onto the gas flow. The more downstream ammonia feeding point sprays an ammonia-bearing liquid with a greater sulfur absorption capacity than the more upstream ammonia feeding point. The more downstream chamber sprays a non-oxidizing liquid onto the gas flow. The liquid may comprise water and/or may be in the form of a pure liquid, solution, salt solution, ionic solution, supersaturated solution, azeotrope, suspension, dispersion, slurry, and/or emulsion, and any combination thereof.

The use of such a segmented process stream results in several unexpected beneficial results. It takes advantage of ammonia's highly effective desulfurization properties but reduces the unwanted ammonia slip. In the more upstream chamber (which may also be referred to as an absorption section), first an ammonia-bearing liquid with a greater sulfur absorption capacity may be sprayed onto incoming gas. Greater sulfur absorption capacity may be obtained by utilizing higher ratio of free ammonia to ammonia-sulfur species than is present in a lesser sulfur absorption capacity composition. In at least one embodiment, greater sulfur absorption capacity may be obtained by utilizing a higher ratio of ammonium sulfite to ammonium sulfate than is present in a lesser sulfur absorption capacity composition. Greater sulfur absorption capacity may be obtained by having a higher pH than that of a lesser sulfur absorption capacity composition. Greater sulfur absorption capacity may be accomplished by having a material with a lower oxidation rate than that of a lesser sulfur absorption capacity composition.

The use of the greater sulfur absorption capacity ammonia-bearing liquid in the absorption section may allow for a highly reactive and therefore highly effective desulfurization of the gas. Further downstream, a second lesser sulfur absorption capacity ammonia-bearing liquid may be sprayed onto the gas flow. This lesser sulfur absorption capacity liquid is not as reactive as that applied earlier in the absorption section, but because it is applied to a gas that has already had the vast majority of its sulfur removed, it need not be as reactive. The lesser sulfur absorption capacity liquid does not readily evaporate or form aerosols. Furthermore, the lesser sulfur absorption capacity liquid converts residual ammonia and ammonium sulfite aerosols from upstream into ammonium sulfate thereby neutralizing up to some or all the ammonia slip.

After undergoing this multi-stage (2 or more) distinct spraying processes, the gas may pass through a liquid-vapor separator and then may enter the second more downstream chamber (also referred to as a fine matter section). In the fine matter section, a relatively non-oxidizing liquid (such as water, alcohol, toluene, glycerol, 6-8 pH liquid, and any combination thereof) may be sprayed onto the gas flow. The non-oxidizing liquid catches particulates and dust particles and does not generate any sources of ammonia slip. As a result, the segmented dual ammonia feed system effectively and efficiently desulfurizes the gas and removes particulate matter with reduced or eliminated ammonia slip.

The liquid-vapor separator may allow for the efficient flow of gas, but may prevent or reduce the flow of non-gases such as liquids or solids. Representative examples of liquid-vapor separators include but are not limited to air caps, liquid covered trays, bubble cap trays, sieve trays, valve trays, tray columns, equivalents thereof, and any combination thereof. In at least one embodiment "efficient flow of gas" means more than 99% of the gas passes through the separator. In at least one embodiment "substantially prevents the flow of non-gases" means less than 89% of the non-gas does not pass through the separator. In at least one embodiment more than one separator and/or more than one type of separator are present between the absorption section and the fine matter section.

Apparatus, methods and compositions for cleaning gas are provided.

The apparatus may include a chamber that includes: a gas input; a first liquid spray array; and a second liquid spray array; the first liquid spray array and the second liquid spray array being located at different locations within the chamber; a first source of ammonia bearing liquid having a conduit to the first liquid spray array; a second source of ammonia bearing liquid having a conduit to the second liquid spray array. The first source and the second source may be configured so that the first source produces ammonia bearing liquid that has a different sulfur absorbing capacity than that produced by the second source.

The first source may produce ammonia bearing liquid having an ammonia concentration that is different from the ammonia concentration of the liquid produced by the second source.

The ammonia bearing liquid of the first source may have a pH greater than 4.6.

The ammonia bearing liquid of the second source may have a pH greater than 4.6.

A temperature inside the chamber is between 30° C. (86° F.) and 70° C. (158° F.).

The chamber may include a demister.

A spray array may include a cone-shaped spray that is, or a pattern of cone-shaped sprays that together are, angled consistent with reaching inner walls of a vessel having a width no less than 110% the maximum horizontal width of the chamber.

The spray arrays, in aggregate, may be configured to deliver no less than 0.2 L of liquid per cubic meter (1.5 gallon of liquid per 1000 cubic feet) of gas flow volume.

The apparatus may include a particle control chamber that is situated downstream from, and in gaseous communication with, the chamber; separated from the chamber by a liquid-vapor separator; and includes: a washing spray array; and a conduit connecting the washing spray array to a particle washing liquid source. The separator may be a collector that allows downstream vapor to pass.

The particle control chamber may include a demister. The demister may include one or more of a baffle plate, a ridge, a filler and a screen.

The particle control chamber may have an interior that is configured to be maintained between 30° C. (86° F.) and 65° C. (149° F.).

The first and second sources may be in fluid communication with an inlet that is configured to receive the liquid from the first and second spray arrays.

The apparatus may include a pre-washing chamber upstream from the gas input and in gaseous communication with the gas input, the pre-washing chamber including a temperature reducing spray array.

The pre-washing chamber may be configured to maintain its interior at a temperature between 35° C. (95° F.) and 80° C. (176° F.).

The apparatus may include a pre-washing chamber upstream from the chamber; and a particle control chamber downstream from the chamber. The pre-washing chamber and the particle control chamber may be in gaseous communication with the chamber; and the pre-washing chamber, particle control chamber, and the chamber all may be positioned within a tower. The oxidation tank may be disposed in the tower.

The apparatus may include a pre-washing chamber upstream from the chamber; and a particle control chamber downstream from the chamber. The pre-washing chamber and the particle control chamber may be in gaseous communication with the chamber; the pre-washing chamber, particle control chamber, and the chamber may be distributed among more than one tower.

The apparatus may include a crystallization basin that is positioned downgrade from a spray array of the spray arrays. The crystallization basin may hold a liquid that contains a sulfur oxide and has a pH less than 5.5.

The crystallization basin may be located at the bottom of the chamber; and may be positioned downgrade from a spray array of the spray arrays.

The apparatus may include a crystallization basin that is located at the bottom of the particle control chamber and positioned downgrade from a spray array of the spray arrays.

The apparatus may include a crystallization basin that is located at the bottom of the pre-washing chamber and positioned downgrade from a spray array of the spray arrays.

The apparatus may include a crystallization basin that is located at the bottom of the tower.

The apparatus may include a crystallization basin that is disposed exterior to the pre-washing chamber. The crystallization basin may hold a liquid that contains sulfur oxide and has a pH less than 6.

The apparatus may include a crystallization basin that is positioned downgrade from a spray array of the spray arrays; and a conduit that extends from the crystallization basin to a solid-liquid separation device.

The apparatus may include an oxidizing chamber in fluidic communication with the chamber via an oxidizing chamber conduit. The oxidizing chamber may include the first source and the second source.

The apparatus may include an oxidizing gas input to the oxidizing chamber; and a gas-liquid contactor inside the oxidizing chamber and positioned to be in gaseous communication with the oxidizing gas input and in fluidic communication with the oxidizing chamber conduit. The gas-liquid contactor may include a structured packing. The gas-liquid contactor comprises a random packing. The gas-liquid contactor may include a perforated plate. The gas-liquid contactor may include a bubble cap. The gas-liquid contactor may include an aeration head.

The oxidizing chamber may include 2-8 gas-liquid contactors.

The oxidizing chamber may be configured to provide, for a fraction of the ammonia bearing liquid, a residence time within the oxidizing chamber of at least 20 minutes.

The apparatus may include a gas delivery device that is configured to deliver through the gas input no less than 20% more than the minimum stoichiometric amount required to oxidize the ammonia bearing liquid for which the gas-liquid contactor is configured to contact.

The methods may include spraying a first ammonia-bearing liquid on a gas stream at a first location in the stream; and spraying a second ammonia bearing liquid on the gas stream at a second location in the stream. The first liquid may have a first sulfur absorbing capacity; the second liquid has a second sulfur absorbing capacity; and the first sulfur absorbing capacity differs from the second sulfur absorbing capacity. The first liquid may have a first oxidation rate. The second liquid may have a second oxidation rate. The first and second oxidation rates may be different.

The different oxidation rates may be different by 0.1%-1%, 1%-2%, 2%-3%, 3%-4%, 5%-6%, 7%-8%, 8%-9%, 9%-10%, or greater, or any suitable value between within those ranges. The difference may be calculated as the difference between the rates divided by the lower of the two rates.

The methods may include, prior to the sprayings, oxidizing the first and second liquids together in a common solution for different periods of time. The different periods of time may be based on different residence times for the different liquids The methods may include passing the gas from the second location through a liquid-vapor separator; and spraying the gas with particle washing solution.

The gas stream, upon entry to the first location, may have an $SO_2$ concentration that is no more than 30,000 mg/Nm$^3$ (10,500 ppm), and, upon exit of a third location downstream from a particulate control chamber, an $SO_2$ concentration of no more than 35 mg/Nm$^3$ (12 ppm).

The gas stream, upon entry to the first location may have a dust concentration of no more than 50 mg/Nm$^3$ (2.9 lb/MMscf), and, upon exit of a third location downstream from a particulate control chamber, a dust concentration of no more than 5 mg/Nm$^3$ (0.29 lb/MMscf).

Upon exit of a third location, downstream from the second location, the gas of the gas stream may have an ammonia concentration of no more than 2 mg/Nm$^3$ (2.6 ppm).

The method may include passing the gas stream into a reactor at the beginning of a cleaning process and out of the reactor at an end of the cleaning process. The first and second locations may be disposed in the ractor. Between the beginning of the cleaning process and the end of the cleaning process more than 98% of the gas stream sulfur may be absorbed. Between the beginning of the cleaning process and the end of the cleaning process more than 99% of ammonia added to the reactor may be recovered.

The methods may include spraying the gas stream with a pre-washing liquid prior to spraying the gas stream with the first liquid; and, after spraying the first liquid and the second liquid: recirculating the first liquid and the second liquid along a first liquid circuit; and recirculating the pre-washing liquid along a pre-washing circuit. The oxidation rate in the first liquid circuit and the oxidation rate in the pre-washing liquid circuit are different.

The oxidation rate of the liquid of the first liquid circuit may be greater than 96%. The oxidation rate of the liquid of the pre-washing circuit may be greater than 99%.

The methods may include adjusting the gas cleaning process in gas stream by: selecting, from an array of ammonia feed points arranged along an ammonia fluid circuit, a feed point at which to inject ammonia; and injecting the ammonia. The feed point may be selected in real time. The feed point may be selected by design and built-in, as one of a plurality of ammonia feed points, to a gas cleaning apparatus.

The feed point may be in an upper layer of an oxidation chamber, an intermediate layer of an oxidation chamber, lower layer of an oxidation chamber.

The feed point may be in an upper layer of an absorption circulation tank in an oxidation system, an intermediate layer of an absorption circulation tank oxidation system, or a lower layer of an absorption circulation tank oxidation system.

The feed point may be in a pre-washing chamber, an absorption spray layer, or at a circulation pump port. The port may be an inlet port. The port may be an outlet port.

The pump may be deliver fluid to an upper layer of an oxidation tank, at an intermediate layer of an oxidation tank, or at a lower layer of an oxidation tank.

The pump may deliver fluid to an upper layer of an absorption circulation tank in an oxidation system, at an intermediate layer of an absorption circulation tank in an oxidation system, or at a lower layer of an absorption circulation tank in an oxidation system.

The pump may deliver fluid to an input to a pre-washing segment.

The pump may deliver fluid to an input to an absorption spray layer.

The adjusting may include increasing a SO2 absorption efficiency.

The adjusting may include reducing ammonia slip.
The adjusting may include reducing aerosol production.
The adjusting may include lowering a pH.
The pH may be that of a liquid in a pre-washing segment.
The injecting may include applying pressure to anhydrous ammonia with a liquid ammonia pump. The injecting may include dispersing the anhydrous ammonia into a circulation circuit flow. The dispersing may include mixing the anhydrous ammonia into the flow with a mixer.

Referring now to FIG. 1 there is shown an illustrative apparatus in accordance with the principles of the invention. The apparatus may include one or more of several systems. The systems include a gas cleaning system (I) (within which the absorption section (3) and a fine matter section (5) are located). The gas cleaning system (I) may include other optional items. FIG. 1 also describes other optional systems with nested optional components such as an oxidation system (II), an ammonia supply system (III) and a post treatment system (IV).

I Gas Cleaning System

In at least one embodiment, absorption section (3) and fine matter section (5) (and one, some, or all of the other optional sections and systems) may be located within a tower (1) (also known as a column) allowing for the upward flow of gas from upstream to downstream locations. Other non-vertical but fluidically communicating configurations of the sections and systems are also contemplated. A flow of raw exhaust gas (7) from a source may be fed either directly into the absorption section or pass through one or more preceding sections such as a pre-washing section (11).

In pre-washing section (11) the incoming gas may have its temperature adjusted (raised or lowered) to a desired level. The temperature may be adjusted by the feeding of a liquid (33) from a spray or port (4) at a desired temperature. The liquid may be moved by a pump (2) and may be recovered and recirculated. The liquid may pass through a heat exchanger or heater to raise or lower the temperature as appropriate. The temperature control may be performed with an oxidizing liquid. The temperature control may be performed within the absorption section (3).

Once properly prepared, the gas then may pass from pre-washing section (11), through a gate (25), and into absorption section (3). Gate (25) may include a valve, a liquid-vapor separator, and/or any other conduit(s) suitable for gas passage. Gate (25) may include a Continuous Emissions Monitoring Systems ("CEMS") to determine the composition of some or all the incoming gas. Representative types of CEMS suitable for use with the invention include but are not limited to chromatography, combustion gas analysis, continuous gas analysis, gas chromatography, quantum cascade laser analyzers, and any combination thereof.

The CEMS data may be in informational communication with an information processing system. The information processing system may be in informational communication with an automation system. The automation system may be constructed and arranged to activate, deactivate, open, close, increase, decrease or otherwise adjust or change any setting or activity of any one, some or all of the items, sections, and systems of the apparatus. The information processing system may include process logic to appropriately send controlling instructions to the automation system in response to data received from the CEMS and/or from any other source including but limited to a measured gas flow rate, liquid flow rate, pH, rate of oxidation, pressure, and/or temperature of at any location, item, section, system, or reagent anywhere therein, and any combination thereof.

When in absorption section (3), the gas may be sprayed by at least two layers of liquid spray arrays (21a, 21b) fed by liquid feeds (32). While FIG. 1 illustrates four upstream layers of liquid spray arrays (21a) and one downstream spray array (21b), any greater or lesser number of spray arrays may be used. The upstream spray array (21b) may be constructed and arranged to release an ammonia-bearing liquid with a greater sulfur absorption capacity to substantially desulfurize the gas. The downstream spray array (21a) may be constructed and arranged to release an ammonia-bearing liquid with a lesser sulfur absorption capacity to neutralize ammonia slip producing materials.

The pre-washing section (11) may provide collection and recirculation of the washing liquid as the liquid alters the temperature of the input gas. The liquid of the pre-washing section may be an ammonia bearing liquid. The circulating washing liquid of the pre-washing section may have a pH value less than or equal to 5.5. The circulating washing liquid of the pre-washing section may have an oxidation rate greater than or equal to 99%.

The washing liquid may flow into a crystallization process. In the crystallization process the pH value may be less than or equal to 6 or less than or equal to 5.5. The crystallization process may occur within or outside of the tower (1) or pre-washing section (11).

The liquid sprayed in the absorption section (3) may be collected and recirculated. The circulating liquid of the absorption section may have a pH of 4.6 or lower. The circulating absorption section liquid may have an oxidation rate greater than or equal to 96%.

Downstream from downstream spray array (21*a*) there may be at least one demister (12*a*). Demister (12*a*) may enhance removal of liquid droplets entrained in a gaseous flow. Suitable representative demisters include but are not limited to mesh type coalescers, vane packs, condensing surfaces, or any other structure that aggregates mist into droplets that are heavy enough to separate from the gaseous flow. The gas flow passes from absorption section (3) to the fine matter section (5) by traveling through one or more liquid-vapor separator (9). The absorption section may include a CEMS. An exit port or conduit (33) may be used to collect or drain sprayed ammonia bearing fluid and the sulfur oxides, other sulfur species, and other materials that the sprayed liquid removes from the gas flow. Alternatively, the sprayed liquid may pool at the bottom of the pre-washing section (11) and/or at the bottom of the absorption section (3) (especially if the gate (25) prevents the downward flow of liquid).

In the fine matter section (5), a non-oxidizing liquid (22) may be fed (optionally by a pump (23)) through a conduit (34*a*) to a spray array (34*b*). This non-oxidizing liquid does not produce any ammonia slip type materials and instead captures any dust particles that either persisted in the gas or that were produced in an upstream section. Gas then may pass through a second demister (12*b*) to capture the non-oxidizing liquid and dust particles entrained therein. At the end of the process, the gas may pass out an outlet (16) as cleaned exhaust (13).

Some or all the spray devices (34*b*, 21*a*, 21*b*, 4) may have a liquid-to-gas ratio of less than 0.2 L/m$^3$ (1.5 gallon/1000 ft$^3$). In at least one embodiment the spray coverage may cover (creates a spray cone base with) a cross sectional area of no less than 110% of the width/cross-sectional area of the section the gas passes through. The superficial gas velocity of the absorption tower may be 1 m/s-5 m/s (3.3 ft/s to 16.4 ft/s), or faster or slower. The operational temperature of the pre-washing section (4) may be within the range of 35° C.-80° C. (95° F. to 176° F.) or higher or lower. The operational temperature of the absorption section (3) may be within the range of 30° C.-70° C. (86° F. to 158° F.) or higher or lower. The operational temperature of the fine matter section (5) may be within the range of 30° C.-65° C. (86° F. to 149° F.) or higher or lower.

The raw exhaust gas input (7) is exhaust that is released from a petrochemical process, an industrial process, a natural gas chemistry process, a coal chemistry process, a shale oil extraction process, a shale gas extraction process, a sulfuric acid based process, a chemical refinement process, a power generation process, a metallurgical process, a papermaking process, and any combination thereof.

A raw gas input (7) having a concentration of SO$_2$ of ≤30000 mg/Nm$^3$ (10,500 ppm) may exit as cleaned exhaust (13) with an SO$_2$ concentration of ≤35 mg/Nm$^3$ (12 ppm).

A raw gas input (7) having a concentration of total dust ≤50 mg/Nm$^3$ (2.9 lb/MMscf) may exit as cleaned exhaust (13) with a total dust concentration of ≤5 mg/Nm$^3$ (0.29 lb/MMscf).

Ammonia vapor may exit as cleaned exhaust (13) with ammonia slip ≤2 mg/Nm$^3$ (2.6 ppm).

II Oxidation System

The apparatus may include an oxidation system (II) to efficiently generate and recirculate the ammonia-bearing liquid. The oxidation system include an oxidation chamber (8). The oxidation chamber may include an apparatus constructed and arranged to generate and release two or more different species of ammonia-bearing liquid, each of the two species having different sulfur absorption capacities. The oxidation chamber (8) may have at least two out-ports through which a lesser sulfur absorption capacity liquid (6) and a greater sulfur absorption capacity liquid (14), respectively, are removed. The different liquids then may be fed to their respective sprays in the absorption section (3).

The oxidation chamber (8) may include a tank holding the ammonia-bearing liquid and one or more gas-liquid contactor. The gas-liquid contactor may be constructed and arranged to contact the amine bearing liquid with O2, air, or any suitable oxidation-reduction agent/gas (10). Suitable representative examples of differential gas-liquid contactors include but are not limited to one or more of a: differential gas-liquid contactor, stagewise gas-liquid contactor, falling-film column, packed column, bubble column, spray tower, gas-liquid agitated vessel, plate column, rotating disc contactor, venturi tube, structured packing, a random packing, a perforated plate, an bubble cap, an aeration head, and the like and any combination thereof.

Oxidation chamber (8) may contain a plurality (2-8 or more or less) differential gas-liquid dispersion enhancers (26). The gas-liquid dispersion enhancers may include a layer comprising a filler and a perforated plate. An oxidizing gas (10) such as air or O$_2$, passes through the perforated plates and oxidizes the ammonia-bearing liquid. The more layers the ammonia-bearing liquid passes through, the more-oxidized it becomes.

The amount of oxidizing gas fed into the gas-liquid contactor may exceed the stoichiometric minimum to oxidize the mass of ammonia bearing liquid in the chamber (8) by 20% or more, or less. The ammonia bearing liquid and gas remain in contact during a residence time of 20 minutes, or more, or less. The oxidation rate of the ammonia bearing liquid with a lesser sulfur absorption capacity may be 90%, or more, or less. The oxidation rate of the ammonia bearing liquid with a greater sulfur absorption capacity may be 96%, or more, or less.

An amine bearing liquid may be sprayed from a spray or port (4) in the pre-washing section (11). The amine bearing liquid may come from an outport from the oxidation chamber (8) or from any other location or source. The oxidation rate of the pre-washing spray liquid circulating washing liquid of the pre-washing section may be 99%, or more, or less.

An efficiency may be gained by recirculating liquid (33) from the absorption section (3) back again to the oxidation chamber (8) reducing the amount of feed material needed to generate the ammonia-bearing liquid. The liquid may be recirculated from the pre-washing section (11), the bottom of the column (1) or any other location where the sprayed liquid accumulates.

The less sulfur absorbing capacity liquid more—may be further diluted by an additional diluent. For the sake of efficiency, the diluent may be from the same liquid source (22) or be any similar liquid as used in the fine matter section (5).

In at least one embodiment, information may be taken from one or more of the CEMS and is used to adjust the properties of one or more of the outflows of the ammonia-bearing liquid. This may be done with an information processing system and/or an automation system.

For example, if the CEMS indicates that excessive ammonia slip is occurring at the outlet (16), one or more of the ammonia bearing liquid flows may be altered by oxidation effects or dilution to be less reactive. The reverse can be done if the CEMS detects persistent sulfur oxides in the outlet (16). In addition, comparisons of the sulfur content at the gate (25) and the outlet (16) may be used to adjust reagent to improve efficiency or effectiveness appropriately increasing or decreasing emissions, or reagent use desired. In addition, ammonia concentration may be changed to reduce corrosion.

The liquid level of the oxidation tank (8) may be greater than 5 m (16.4 ft). The oxidizing air may exceed the stoichiometric minimum by more than 20%. The net residence time of the solution may be ≥20 minutes. The oxidation rate of the absorption circulation liquid (32) may be ≥96%. The oxidation rate of the circulating washing liquid (33) of the pre-washing section may be ≥99%.

III Ammonia Supply System

Ammonia or ammonia precursor materials may be fed directly into one, some, or all of: the pre-washing section (11), the absorption section (3), the tower (1) (near the bottom or elsewhere), and the oxidation chamber (8). Information from CEMS may be used to increase or decrease the flow of ammonia into the gas cleaning system (I) or the oxidation system (II). Ammonia feed is one manner, but is not the only manner, of adjusting the pH at any location in the apparatus.

IV Post Treatment System

The circulating washing liquid of the pre-washing section may be concentrated (crystallized) in the pre-washing section (4) or may be subjected to evaporative crystallization (31) outside the tower, and may be processed into a commercial ammonium sulfate by an ammonium sulfate post-treatment system (IV). An integrated drying tower may be used to directly produce ammonium sulfate from a part of the circulating washing liquid of the pre-washing section when it is required to control harmful metal ions such as chloride, fluoride, and the like, in the solution.

The post-treatment system (IV) may include a primary solid-liquid separation (181), and optionally: a secondary solid-liquid separation (182), an integrated drying tower (183), and a packaging machine (184). Suitable representative devices usable for solid-liquid separation may include but are not limited to any mass transfer process that converts a mixture of solid and liquid into two or more distinct product mixtures, at least one of which is enriched in the solid and one in the liquid of the mixture's constituents. It may include but is not limited to such processes as: adsorption, centrifugation, cyclonic separation, density based separation, chromatography, crystallization, decantation, distillation, drying, electrophoresis, elutriation, evaporation, extraction, leaching extraction, liquid-liquid extraction, solid phase extraction, flotation, dissolved air flotation, froth flotation, flocculation, filtration, mesh filtration, membrane filtration, microfiltration, ultrafiltration, nanofiltration, reverse osmosis, fractional distillation, fractional freezing, magnetic separation, precipitation, recrystallization, sedimentation, gravity separation, sieving, stripping, sublimation, vapor-liquid separation, winnowing, zone refining, and any combination thereof.

The produced ammonium sulfate solids may be salable as a commercial product defraying operational costs and increasing the overall efficiency of the apparatus. The crystallized material may be in the form of a slurry reducing the efforts required by the solid-liquid separation processes (181, 182).

One or both of the species of ammonia bearing liquids may be replaced with one or more non-ammonia bearing desulfurizing liquids that differ from each other in oxidation potential or sulfur absorbing capability.

EXAMPLES

The following examples, which are presented for purposes of illustration and are not intended to limit the scope of the invention. Application of the principles of the invention is not limited to the conditions set forth in the examples, and it will be understood that the principles encompasses various changes and modifications to the examples described herein, and that such changes and modifications can be made without departing from the spirit and scope of the invention.

Example 1

An apparatus for removing sulfur oxides and dust in gas by ammonia process was assembled. The apparatus included a gas cleaning and removing system (I), an oxidation system (II), an ammonium sulfate post-treatment system (IV), an ammonia supply system (III) and an auxiliary system.

The gas cleaning and removing system (I) included an absorption tower (1), a circulation tank (23, 22) of a fine particulate matter an ammonia escape control section, a circulation pump (24, 23) of a fine particulate matter an ammonia escape control section, and a pre-washing circulation tank (11). The oxidation system (II) comprised an oxidation tank (8), an upper-layer absorption circulation pump (6), and a lower-layer absorption circulation pump (14). The ammonium sulfate post-treatment system (IV) comprised a primary solid-liquid separation (181), a secondary solid-liquid separation (182), an integrated drying tower (183), and a packaging machine (184).

The absorption tower of the gas cleaning and removing system used segmented control and was divided into a pre-washing circulation tank (11), a pre-washing section (4), an absorption section (3), and a fine particulate matter control section (5). The pre-washing section (4), the absorption section (3), and the fine particulate matter control section (5) were provided, respectively, with two spray layers (21a, 21b), five spray layers (21a, 21b), and two spray layers (21a, 21b). The pre-washing section (4) concentrated a desulfurizing circulating washing liquid (33) of the pre-washing section's absorption liquid (32) at the same time of reducing the temperature of raw flue gas (7). The absorption section (3) absorbed and removed sulfur dioxide in flue gas so as to control ammonia escape and aerosol generation. The fine particulate matter control section (5) further controlled fine particulate matters.

A multipoint ammonia-feeding strategy was used and the reaction was sufficient to significantly prevent ammonia escape and aerosol generation. An ammonia-containing desulfurizing agent was added from the upper layer and the lower layer of the oxidation tank (8), the pre-washing section (4), the pre-washing circulation tank 11, through the the inlets and the outlets of upper-layer/lower-layer the absorption circulation pumps 6/14, and the outlet of the pre-washing circulation pump (2).

CEMSs (25) were mounted at a flue gas inlet (20) and a flue gas outlet (16). The CEMS at the flue gas inlet detected flue gas in terms of temperature, pressure, flow rate, nitrogen oxides concentration, sulfur dioxide concentration, water content, oxygen content, and dust content. The CEMS at the flue gas outlet detected flue gas in terms of temperature, pressure, flow rate, nitrogen oxides concentration, sulfur dioxide concentration, water content, oxygen content, free ammonia content, and dust content.

The liquid-to-gas ratio in each layer of a liquid distributor in the absorption section functional zone (3) was 1.2 L/m$^3$ (9.0 gallon/1000 ft$^3$), the spray coverage was 125%, and the total spray coverage of the absorption section was no less than 500%. The liquid-to-gas ratio in each layer of the fine particulate matter control section functional zone 5 was 1.1 L/m$^3$ (8.2 gallon/1000 ft$^3$), and the spray coverage was 140% of the width of the section.

Two layers of demisters (12) were provided at the upper part of the absorption section functional zone (3), and the demisters employed a layer of a high-efficiency ridge plus a layer of a high-efficiency baffle plate. Three layers of demisters were provided at the upper part of a demisting section of the fine particulate matter control functional zone section (5), and the demisters employed two layers of ridges plus one layer of a screen. Table 1 illustrates the operations parameters of the system when the process was run.

TABLE 1

| No. | Process index | Unit | Value |
|---|---|---|---|
| 1 | Amount of boiler flue gas | Nm³/h | 510000 |
| 2 | Temperature at flue gas inlet | ° C. | 130-150 |
| 3 | SO₂ concentration of flue gas | mg/Nm³ | 4500 |
| 5 | Dust concentration at flue gas inlet | mg/Nm³ | ≤20 |
| 6 | SO₂ concentration of flue gas at outlet | mg/Nm³ | ≤35 |
| 7 | Dust concentration of flue gas at outlet | mg/Nm³ | ≤5 |
| 8 | Recovery and utilization rate of ammonia | % | ≥99 |

| No. | Process Index | Unit | Value |
|---|---|---|---|
| 1 | Amount of boiler flue gas | SCFM | 323,000 |
| 2 | Temperature at flue gas inlet | ° F. | 266-302 |
| 3 | SO₂ concentration of flue gas | ppm | 1,575 |
| 5 | Dust concentration at flue gas inlet | lb/MMscf | ≤1.2 |
| 6 | SO₂ concentration of flue gas at outlet | ppm | ≤12 |
| 7 | Dust concentration of flue gas at outlet | lb/MMscf | ≤0.29 |
| 8 | Ammonia recovery and utilization | % | ≥99 |

Flue gases from different working conditions of an industrial facility were subjected to ammonia desulfurization and dedusting by using the apparatus. The raw flue gas entered the pre-washing section from a flue gas inlet 20 and was brought into countercurrent contact with a circulating washing liquid of the pre-washing section to remove dust, $SO_3$, and a part of $SO_2$ in flue gas. It then entered an absorption section and was brought into countercurrent contact with an absorption circulation liquid to allow $SO_2$ in the flue gas to be absorbed. It then entered a fine particulate matter control section to remove a small amount of free ammonia and aerosol in flue gas as well as atomized droplets. Finally, the clean flue gas was directly discharged from a flue gas outlet at the top of the tower.

The absorption circulation liquid was under the oxidation of compressed air (10), and sulfite in the mixed liquid and was oxidized into sulfate. The solution at the upper part had an oxidation rate of 99%, a density of 1.15 g/L (a specific gravity of 1.15), and a pH of 4.75. The solution at the lower part had an oxidation rate of 97%, a density of 1.12 g/L (a specific gravity of 1.12), and a pH of 5.7.

The compressed air 10 was delivered to the lower part of the oxidation system through a pipeline, and outlet gas of the oxidation system is delivered to the pre-washing section 4 of the absorption tower 1 and was used for stirring. Process water (24) was replenished in the circulation tank (22) of the fine particulate matter control section. The superficial gas velocity of the absorption tower was 3.1 m/s (10.2 ft/s). The operational temperature of the pre-washing section was 53° C. (127° F.). The operational temperature of the absorption section was 49° C. (120° F.). The operational temperature of the fine particulate matter control was 47° C. (117° F.). Table 2 lists the operational parameters and test results of Example 1

TABLE 2

| No. | | Item | Unit | Test result | Notes |
|---|---|---|---|---|---|
| 1 | Amount of flue gas of integrated absorption tower | Normal conditions, wet-basis, practical O2 | ×10⁴ m³/h | 35.96 | — |
| | | Normal conditions, dry-basis, 6% O2 | ×10⁴ m³/h | 38.88 | — |
| 2 | | System pressure drop | Pa | 1021 | — |
| 3 | Parameters of raw flue gas | SO₂ concentration (normal conditions, dry-basis, 6% O₂) | mg/Nm³ | 811.78 | Average during test |
| | | O₂ (V/V) | % | — | — |
| | | SO₃ concentration normal conditions, dry-basis, 6% O₂) | mg/Nm³ | 9.8 | Average during test |
| | | Temperature | ° C. | 127.3 | Average during test |
| | | Moisture content (V/V) | % | 7.70 | — |
| | | Dust concentration (normal conditions, dry-basis, 6% O₂) | mg/Nm³ | 9.7 | — |
| 4 | Parameters of clean flue gas | SO₂ concentration (normal conditions, dry-basis, 6% O₂) | mg/Nm³ | 15.73 | Average during test |
| | | O₂ (V/V) | % | — | — |
| | | SO₃ concentration (normal conditions, dry-basis, 6% O₂) | mg/Nm³ | 0.8 | Average during test |
| | | Temperature | ° C. | 47 | Average during test |
| | | Moisture content (V/V) | % | 14.23 | — |
| | | Dust concentration (normal conditions, dry-basis, 6% O₂) | mg/Nm³ | 1.9 | including solid particulate matters and soluble solid particulate matters |
| | | Slipped free ammonia (normal conditions, dry-basis, 6% O₂) | mg/Nm³ | 0.06 | — |
| | | Slipped ammonium salts (normal conditions, dry-basis, 6% O₂) | mg/Nm³ | 0.43 | — |

TABLE 2-continued

| No. | Item | | Unit | Test Result | Notes |
|---|---|---|---|---|---|
| 5 | Desulfurization efficiency of integrated absorption tower | | % | 98.05 | $SO_2$ concentration of raw flue gas is lower than the designed value |
| 6 | Dedusting efficiency of integrated absorption tower | | % | 80.5 | — |
| 7 | $SO_3$ removing efficiency of integrated absorption tower | | % | 91.8 | |
| 8 | Power consumption (excluding ammonium sulfate system) | | kWh/h | 882.1 | — |
| 9 | Ammonia consumption (anhydrous ammonia) | | t/h | 0.189 | (Converted to anhydrous ammonia) |
| 10 | Ammonia utilization rate | | % | 99.88 | — |
| 11 | Byproduct ammonium sulfate | Nitrogen content | % | 21.2 | |
| | | Moisture | % | 0.2 | — |
| | | Free acid content | % | 0.02 | — |

| No. | Item | | Unit | Test Result | Notes |
|---|---|---|---|---|---|
| 1 | Amount of flue gas of integrated absorption tower | Standard conditions, wet-basis, actual $O_2$ | ×10$^4$ scfm | 22.80 | — |
| | | Normal conditions, dry-basis, 6% $O_2$ | ×10$^4$ scfm | 24.65 | — |
| 2 | System pressure | | inwc | 4.10 | — |
| 3 | Parameters of raw flue gas | $SO_2$ concentration (Standard conditions, dry-basis, 6% $O_2$) | ppmv | 284.1 | Average during test |
| | | $O_2$(V/V) | vol % | — | — |
| | | $SO_3$ concentration (Standard conditions,, dry-basis, 6% $O_2$) | ppmv | 2.7 | Average during test |
| | | Temperature | °F. | 261.1 | Average during test |
| | | Moisture content (V/V) | % | 7.70 | — |
| | | Dust concentration (Standard conditions, dry-basis, 6% $O_2$) | lb/MMscf | 0.56 | — |
| 4 | Parameters of clean flue gas | $SO_2$ concentration (s Standard conditions, dry-basis, 6% $O_2$) | ppmv | 5.51 | Average during test |
| | | $O_2$(V/V) | vol % | — | — |
| | | $SO_3$ concentration (Standard conditions, dry-basis, 6% $O_2$) | ppmv | 0.2 | Average during test |
| | | Temperature | °F. | 116.6 | Average during test |
| | | Moisture content (V/V) | % | 14.23 | — |
| | | Dust concentration (Standard conditions, dry-basis, 6% $O_2$) | lb/MMbtu | 0.11 | including solid particulates and soluble solid particulates |
| | | Slipped free ammonia (Standard conditions, dry-basis, 6% $O_2$) | ppmv | 0.08 | — |
| | | Slipped ammonium salts (Standard conditions, dry-basis, 6% $O_2$) | lb/MMscf | 0.025 | — |
| 5 | Desulfurization efficiency of integrated absorber | | % | 98.05 | $SO_2$ concentration of raw flue gas is lower than the designed value |
| 6 | Dedusting efficiency of integrated absorber | | % | 80.5 | — |
| 7 | $SO_3$ removing efficiency of integrated absorber | | % | 91.8 | |
| 8 | Power consumption (excluding ammonium sulfate system) | | kWh/h | 882.1 | — |
| 9 | Ammonia consumption (anhydrous ammonia) | | short ton/hr | 0.208 | Converted to anhydrous ammonia |
| 10 | Ammonia recovery | | % | 99.88 | — |
| 11 | Byproduct ammonium sulfate | Nitrogen content | % | 21.2 | |
| | | Moisture | % | 0.2 | — |
| | | Free acid content | % | 0.02 | — |

The data demonstrated that the process resulted in a desulfurization efficiency of 98.05%. Based on extrapolation from prior art sources, an ammonia based process lacking the segmentation and multi stage ammonia feed would not have exceeded 97% desulfurization. The dedusting efficiency of the process resulted in a desulfurization efficiency of 80.5%. Based on extrapolation from prior art sources, an ammonia based process lacking the segmentation and multi stage ammonia feed would not have exceeded 78% dedusting.

Example 2

A test similar to EXAMPLE 1 was conducted using a different flue gas sample and different operational parameters. Table 3 lists the parameters and the operational results.

TABLE 3

| No. | Section | Tested Item | Unit | First period | Second period |
|---|---|---|---|---|---|
| 1 | Flue gas inlet | Temperature of flue gas | °C. | 110 | 120 |
| 2 | | Average flow rate of flue gas | m/s | 11.2 | 11.5 |
| 3 | | Sectional area of pipeline | m² | 16 | 16 |
| 4 | | Full pressure | kPa | 1.38 | 1.49 |
| 5 | | Moisture content of flue gas | % | 7.5 | 7.5 |
| 6 | | Amount of standard-state dry flue gas | m³/h | $4.67 \times 10^5$ | $4.56 \times 10^5$ |
| 7 | | Oxygen content | % | 3.75 | 3.76 |
| 8 | Dust | Measured discharge concentration | mg/m³ | 43.7 | 44.8 |
| 9 | | Discharge rate | kg/h | 20.4 | 20.4 |
| 10 | SO2 | Measured discharge concentration | mg/m³ | $2.97 \times 10^3$ | $2.98 \times 10^3$ |
| 11 | | Discharge rate | kg/h | $1.39 \times 10^3$ | $1.36 \times 10^3$ |
| 12 | Flue gas outlet | Temperature of flue gas | °C. | 46 | 46 |
| 13 | | Sectional area of duct | m² | 13.2 | 13.2 |
| 14 | | Full pressure | KPa | 0.03 | 0.04 |
| 15 | | Measured amount of flue gas | m³/h | $6.46 \times 10^5$ | $6.32 \times 10^3$ |
| 16 | | Dry flue gas under standard conditions | m³/h | $4.74 \times 10^5$ | $4.64 \times 10^3$ |
| 17 | | Oxygen content of flue gas | % | 3.93 | 3.94 |
| 18 | Dust | Discharge concentration at 6% oxygen | mg/m³ | 4.31 | 4.76 |
| 19 | | Discharge rate | kg/h | 2.33 | 2.51 |
| 20 | SO₂ | Discharge concentration at 6% oxygen | mg/m³ | 5.03 | 7.54 |
| 21 | | Discharge rate | kg/h | 2.71 | 3.98 |
| 22 | Ammonia | Discharge concentration at 6% oxygen | mg/m³ | 0.250 | <0.235 |
| 23 | | Desulfurization efficiency | % | 99.81 | 99.71 |
| 24 | | Dedusting efficiency | % | 88.58 | 87.70 |
| 25 | | Tower pressure drop | kPa | 1.35 | 1.45 |
| 1 | Flue gas inlet | Temperature of flue gas | °F. | 230 | 248 |
| 2 | | Average flow rate of flue gas | ft/s | 36.7 | 37.7 |
| 3 | | Sectional area of duct | ft² | 172 | 172 |
| 4 | | Full pressure | inwc | 5.55 | 5.99 |
| 5 | | Moisture content of flue gas | % | 7.5 | 7.5 |
| 6 | | dry flue gas under standard conditions | scfm | $2.96 \times 10^5$ | $2.89 \times 10^5$ |
| 7 | | Oxygen content | % | 3.75 | 3.76 |
| 8 | Dust | Measured discharge concentration | lb/MMscf | 2.53 | 2.60 |
| 9 | | Discharge rate | lb/hr | 45.0 | 45.0 |
| 10 | SO₂ | Measured discharge concentration | ppmv | 1040 | 1043 |
| 11 | | Discharge rate | lb/h | 3064 | 2998 |
| 12 | Flue gas outlet | Temperature of flue gas | °F. | 115 | 115 |
| 13 | | Sectional area of duct | ft² | 142.1 | 142.1 |
| 14 | | Full pressure | inwc | 0.12 | 0.16 |
| 15 | | Measured amount of flue gas | ft³/min | $3.80 \times 10^5$ | $3.72 \times 10^3$ |
| 16 | | dry flue gas flow rate under standard conditions | scfm | $3.01 \times 10^5$ | $2.94 \times 10^3$ |
| 17 | | Oxygen content of flue gas | % | 3.93 | 3.94 |
| 18 | Dust | discharge concentration at 6% oxygen | lb/MMscf | 0.250 | 0.276 |
| 19 | | Discharge rate | lb/h | 5.14 | 5.53 |
| 20 | SO₂ | discharge concentration at 6% oxygen | ppmv | 1.76 | 2.64 |
| 21 | | Discharge rate | lb/h | 5.97 | 8.77 |
| 22 | Ammonia | discharge concentration at 6% oxygen | ppmv | 0.329 | <0.310 |
| 23 | | Desulfurization efficiency | % | 99.81 | 99.71 |
| 24 | | Dedusting efficiency | % | 88.58 | 87.70 |
| 25 | | Tower pressure drop | inwc | 5.43 | 5.83 |

The data demonstrate desulfurization in the amount of 99.81% and 99.71%, where extrapolated prior art ammonia-based methods would typically only result in at most 98% under the same conditions. Also, dedusting efficiency was 88.58% and 87.70%, where extrapolated prior art ammonia-based methods would typically only yield 82-83% reductions.

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. The principles of the invention encompass any possible combination of some or all of the various embodiments mentioned herein, described herein and/or incorporated herein. The principles of the invention encompass any possible combination that also specifically excludes any one or some of the various embodiments mentioned herein, described herein and/or incorporated herein.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified. Unless explicitly stated otherwise, the term "molecular weight" means weight average molecular weight (Mw).

What is claimed is:

1. An apparatus for cleaning gas, the apparatus comprising:
    a first chamber that includes:
        a gas input;
        a first liquid spray array; and
        a second liquid spray array; the first liquid spray array and the second liquid spray array being located at different locations within the chamber;
    a second chamber including an oxidizing chamber;
    a first source of ammonia bearing liquid having a conduit to the first liquid spray array; and
    a second source of ammonia bearing liquid having a conduit to the second liquid spray array;
wherein the first source and the second source are configured so that the first source produces ammonia bearing liquid that has a different sulfur absorbing capacity than that produced by the second source; and
    the oxidizing chamber includes the first source and the second source.

2. The apparatus of claim 1 wherein the first source produces ammonia bearing liquid having an ammonia concentration that is different from the ammonia concentration of the liquid produced by the second source.

3. The apparatus of claim 1 wherein at least one of the ammonia bearing liquid of the first source and the ammonia bearing liquid of the second source has a pH greater than 4.6.

4. The apparatus of claim 1 wherein the first chamber is configured to be maintained at an operating temperature between 30° C. (86° F.) and 70° C. (158° F.).

5. The apparatus of claim 1 further comprising a demister within the first chamber.

6. The apparatus of claim 1 wherein the spray array includes a pattern of cone-shaped sprays that together are angled consistent with reaching inner walls of a vessel having a width no less than 110% the maximum horizontal width of the first chamber.

7. The apparatus of claim 1 wherein the spray arrays, in aggregate, are configured to deliver no less than 0.2 L of liquid per cubic meter (1.5 gallon liquid per 1000 cubic feet) of gas flow volume.

8. The apparatus of claim 1 further comprising a particle control chamber, the particle control chamber:
    situated downstream from, and in gaseous communication with, the first chamber;
    separated from the first chamber by a liquid-collector that allows vapor to pass downstream; and
    including:
        a washing spray array; and
        a conduit connecting the washing spray array to a particle washing liquid source.

9. The apparatus of claim 8 wherein the particle control chamber includes a demister.

10. The apparatus of claim 9 wherein the demister includes a baffle plate type.

11. The apparatus of claim 9 wherein the demister includes a ridge type.

12. The apparatus of claim 9 wherein the demister includes a packing type.

13. The apparatus of claim 9 wherein the demister includes a wire-mesh type.

14. The apparatus of claim 8 wherein the particle control chamber is configured to be maintained at a temperature between 30° C. (86° F.) and 65° C. (149° F.).

15. The apparatus of claim 1 wherein the first and second sources are in fluid communication with an inlet that is configured to receive the liquid from the first and second spray arrays.

16. The apparatus of claim 1 further comprising a pre-washing chamber upstream from the gas input and in gaseous communication with the gas input, the pre-washing chamber including a temperature reducing spray array.

17. The apparatus of claim 16 wherein the pre-washing chamber is configured to be maintained at a temperature between 35° C. (95° F.) and 80° C. (176° F.).

18. The apparatus of claim 1 further comprising:
    a pre-washing chamber upstream from the first chamber; and
    a particle control chamber downstream from the first chamber
    wherein:
    the pre-washing chamber and the particle control chamber are in gaseous communication with the first chamber; and
    the pre-washing chamber, the particle control chamber, and the first chamber are all positioned within a tower.

19. The apparatus of claim 1 further comprising:
    a pre-washing chamber upstream from the first chamber; and
    a particle control chamber downstream from the first chamber; wherein:
    the pre-washing chamber and the particle control chamber are in gaseous communication with the first chamber; and
    the pre-washing chamber, the particle control chamber, and the first chamber are distributed among more than one tower.

20. The apparatus of claim 1 wherein the oxidizing chamber is in fluidic communication with the first chamber via an oxidizing chamber conduit.

21. The apparatus of claim 20 further comprising:
an oxidizing gas input to the oxidizing chamber; and
a gas-liquid contactor inside the oxidizing chamber and positioned to be in gaseous communication with the oxidizing gas input and in fluidic communication with the oxidizing chamber conduit.

22. The apparatus of claim 21 in which the gas-liquid contactor includes a structured packing.

23. The apparatus of claim 21 in which the gas-liquid contactor comprises a random packing.

24. The apparatus of claim 21 which the gas-liquid contactor comprises a perforated plate.

25. The apparatus of claim 21 which the gas-liquid contactor comprises a bubble cap.

26. The apparatus of claim 21 in which the gas-liquid contactor comprises an aeration head.

27. The apparatus of claim 21 further comprising a gas delivery device that is configured to deliver through the gas input no less than 20% more than the minimum stoichiometric amount required to oxidize the ammonia bearing liquid for which the gas-liquid contactor is configured to contact.

28. The apparatus of claim 1 in which the oxidizing chamber comprises 2-8 gas-liquid contactors.

29. The apparatus of claim 1 wherein the oxidizing chamber is configured to provide for a fraction of the ammonia bearing liquid a residence time within the oxidizing chamber of at least 20 minutes.

* * * * *